Oct. 17, 1961    M. SEYFFER    3,004,375
LAWN MOWER WITH AN AUXILIARY HANDLE
Filed Sept. 18, 1959

INVENTOR
Max Seyffer

BY Strauch, Nolan & Neale
ATTORNEYS

United States Patent Office 3,004,375
Patented Oct. 17, 1961

3,004,375
LAWN MOWER WITH AN AUXILIARY HANDLE
Max Seyffer, Munich, Germany, assignor to Rockwell G.m.b.H., Pinneberg, near Hamburg, Germany, a corporation of Germany
Filed Sept. 18, 1959, Ser. No. 840,869
Claims priority, application Germany Sept. 23, 1958
3 Claims. (Cl. 56—25.4)

The present invention relates to improvements in lawn mowers driven by an internal combustion engine which engine is started by hand by means of pulling e.g. by means of a reversing starting device. It is a disadvantage of such apparatus of the prior art that there is no handle or supporting device against which one can support oneself during starting of the engine. The engine itself is not adapted to serve as support as on restarting after a short stop it still is hot. Also, the engine contains parts such as its fuel container, its carburetor etc. which parts should not to be used as a support. The operator of the lawn mower therefore usually supports himself by one foot placed on the housing of the lawn mower. United States Patent No. 2,731,007, issued January 17, 1956, to D. O. Benson for Gasoline Motor Starting Device is illustrative of such prior lawn mowers. Supporting oneself in this way, however, is dangerous, as, on starting the engine, a torque moment is supplied also to the apparatus whereby the foot can slide off the top of the mower housing and under it into the path of the mower blade. If, at this moment, the motor starts, the person starting the mower is in great danger of considerable injury to this foot.

According to the invention this disadvantage of lawn mowers of the prior art is avoided by providing a handle serving as a counter support during starting of the engine. This handle suitably is arranged near the engine as close as possible to the starting device, thus supplying a torque moment as small as possible to the entire apparatus. The handle in its preferred embodiment is a U-shaped stirrup extending preferably in an upward direction over the starting device so that during starting of the engine, a moment is applied through the handle which is effective to keep the lawn mower on the ground, that is to press it toward the ground. The handle, in addition, can serve effectively as a carrier for the lawn mower.

These and other objects of the present invention will come more fully apparent by reference to the appended claims and as the following detailed description proceeds in reference to the accompanying drawings wherein:

Figure 1:
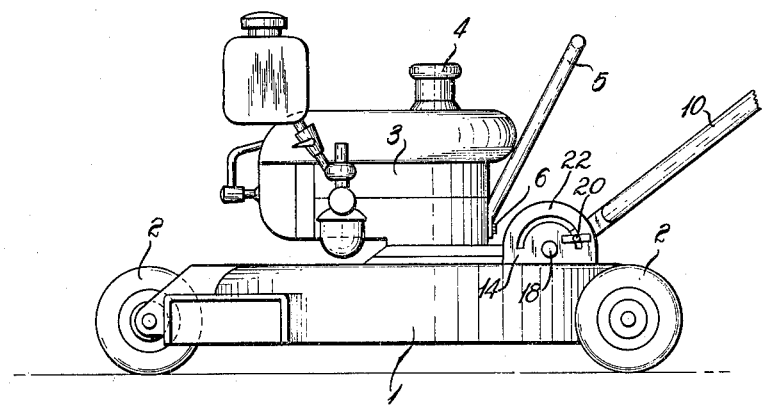
FIG. 1 illustrates a lawn mower in fragmentary side elevation.
Figure 2:
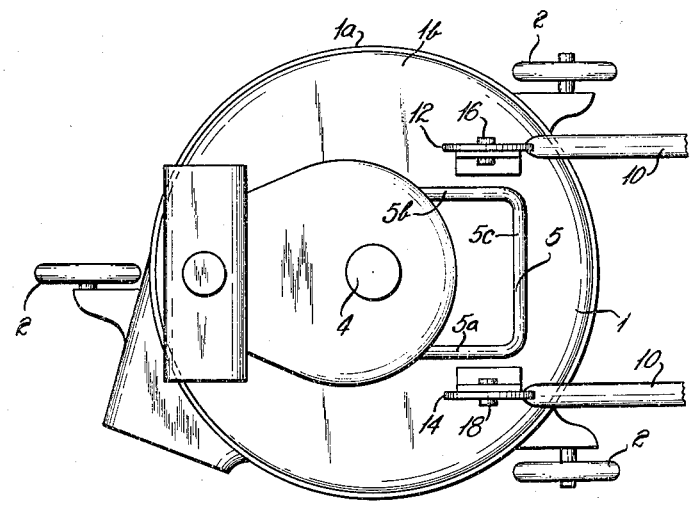
FIG. 2 is a fragmentary plan view of a lawn mower.

The open bottom housing 1 of the lawn mower encloses at the top 1a and sides 1b the horizontal path of rotation of cutter bar (not shown) rotatably mounted on the top wall 1a of housing 1. The housing 1 is supported for movement by ground engaging wheels 2 journalled on the housing 1. The mover is normally pushed or pulled by a handle 10 pivotally connected to housing 1 by brackets 12 and 14 fixed to housing 1 and pivot studs 16 and 18 pivotally interconnecting handle 10 to brackets 12 and 14 respectively for pivotal movement with respect to housing 1 about an axis defined by the coaxial centers of pivot studs 16 and 18 parallel to the rotation axes of wheels 2. The co-action of pin 20 fixed to handle 10 with an arcuate slot 22 in bracket 14 defines the limits of relative movement between handle 10 and housing 1. Fixed on top of the housing 1 is an internal combustion engine 3, the vertical crankshaft (not shown) of which has fixed at its upper end a cable pull starter embodying a starter roll or pulley 4 of conventional design. In order to start the engine 3, a ribbon, cable or a strip (not shown) is wound around the starter roll 4, and by pulling it tangentially of roll 4, the engine is started. A lawn mower of this type is illustrated in the aforesaid Benson patent to which reference is made in the event a more detailed description of the foregoing structure is deemed desirable. Instead of the starter roll 4, a conventional reversing rope or strip actuated roll or pulley equipped starting device can be used, by which the strip or the like for starting the motor after finishing the starting process automatically is wound. Such a device is illustrated in United States Patent 2,912,966, issued November 17, 1959, to G. S. Mitchell for Power Lawn Mower Having Starting Mechanism Easily Available to Operator.

To provide a counter support on starting the engine 3, a handle 5 of U-shape configuration is fixed at its opposite ends 5a and 5b to the engine 3 by screws 6. The height of the horizontal central portion 5c of the handle 5 and its rearwardly offset position relative to the housing 1 and the path through which the starting strip is pulled is such that, on starting the engine, the operator is supporting himself with his one hand on the central portion 5c of the handle 5 and is pulling the starting strip with his other hand, so that an opposing torque moment is developed through the handle 5 and applied to the housing 1 which is effective to press the lawn mower against the ground. As is apparent handle 5, being rigidly fixed to the housing of engine 3, can serve as a carrier by which the mower can be lifted and carried.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power driven lawn mower of the rotary type having a housing supported by ground engaging wheels, an internal combustion engine mounted on said housing, a cable pull starter roll mounted on said engine, and a U-shaped auxiliary handle rigidly fixed to said engine adjacent said starter roll whereby the operator may grip said U-shaped handle to stabilize the mower while actuating said starter roll.

2. The mower defined in claim 1 wherein a hand grip portion of said handle extends substantially perpendicular to a line tangent to the periphery of said roll whereby the operator may grip said hand grip portion of said handle with one hand and exert tension upon a cable wound on said roll with the other hand in such a manner that the separate lines of action of the forces exerted on the mower housing by the operator's opposite hands are substantially parallel.

3. The mower defined in claim 1 wherein said mower is provided with a primary handle pivotally connected to said mower housing to facilitate operator imposed movement of said mower and wherein said auxiliary handle is disposed between said primary handle and said engine.

References Cited in the file of this patent
UNITED STATES PATENTS

| | | |
|---|---|---|
| 2,518,093 | Sutter | Aug. 8, 1950 |
| 2,590,820 | Jedlicka | Mar. 25, 1952 |
| 2,731,007 | Benson | Jan. 17, 1956 |
| 2,850,003 | Konle | Sept. 2, 1958 |
| 2,912,966 | Mitchell | Nov. 17, 1959 |